United States Patent
Noheji et al.

(10) Patent No.: US 7,729,619 B2
(45) Date of Patent: Jun. 1, 2010

(54) DISPERSION COMPENSATION CONTROLLING APPARATUS AND METHOD FOR SEARCHING FOR AMOUNT OF DISPERSION CONTROL

(75) Inventors: Kiyotoshi Noheji, Kawasaki (JP); Hiroki Ooi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/329,095

(22) Filed: Dec. 5, 2008

(65) Prior Publication Data

US 2009/0080902 A1   Mar. 26, 2009

Related U.S. Application Data

(63) Continuation of application No. PCT/JP2006/311346, filed on Jun. 6, 2006.

(51) Int. Cl.
*H04B 10/12* (2006.01)

(52) U.S. Cl. ............... 398/147; 398/148; 398/149; 398/158; 398/159; 398/162; 398/25; 398/29; 398/208

(58) Field of Classification Search ........... 398/25, 398/29, 147–150, 158, 159, 162, 208, 209
See application file for complete search history.

(56) References Cited

U.S. PATENT DOCUMENTS

| | | | | |
|---|---|---|---|---|
| 5,465,353 A | * | 11/1995 | Hull et al. | 707/5 |
| 5,717,510 A | | 2/1998 | Ishikawa et al. | |
| 6,757,255 B1 | * | 6/2004 | Aoki et al. | 370/252 |
| 2002/0089724 A1 | * | 7/2002 | Nishimoto et al. | 359/161 |
| 2004/0184813 A1 | | 9/2004 | Mikami | |
| 2004/0213578 A1 | | 10/2004 | Takahara et al. | |
| 2005/0047192 A1 | * | 3/2005 | Matsui et al. | 365/145 |

FOREIGN PATENT DOCUMENTS

| | | |
|---|---|---|
| JP | 8-321805 | 12/1996 |
| JP | 2002-208892 | 7/2002 |
| JP | 2004-118860 | 4/2004 |
| JP | 2004-128974 | 4/2004 |
| JP | 2004-236097 | 8/2004 |
| JP | 2004-304559 | 10/2004 |

OTHER PUBLICATIONS

International Search Report mailed on Aug. 22, 2006 in connection with International Application No. PCT/JP2006/311346.

* cited by examiner

*Primary Examiner*—Li Liu
(74) *Attorney, Agent, or Firm*—Staas & Halsey LLP

(57) ABSTRACT

In order to enhance dispersion control, the apparatus includes a dispersion controller; a quality index generator generating a quality index representing a quality of an optical signal output from the dispersion controller; and a searching unit searching for an amount of dispersion control applying to the dispersion controller which amount optimizes the quality index, wherein the searching unit includes a splitting-half searching unit roughly searching, in a splitting half method, a range in which dispersion is controllable by the dispersion controller for an amount of dispersion control such that the quality index generated by the quality index generator becomes preferable, and a sweep searching unit thoroughly searching, by sweeping, a limited range based on the amount of dispersion searched by the splitting-half searching unit for an amount of dispersion control that optimizes the quality index generated by the quality index generator.

14 Claims, 8 Drawing Sheets

DISPERSION COMPENSATION CONTROLLING APPARATUS AND METHOD FOR SEARCHING FOR AMOUNT OF DISPERSION CONTROL

CROSS REFERENCE TO RELATED APPLICATION(S)

This application is continuation of an International Application No. PCT/JP2006/311346 which was filed on Jun. 6, 2006, in Japan, which is herein incorporated by reference.

FIELD

The present embodiment(s) discussed herein relates to dispersion compensation controlling apparatus or a method for searching for an amount of dispersion control, which are able to use in broadband transmission of optical signals for a long distance.

BACKGROUND

A recent optical transmission system has been further enhancing the transmission speed and has put transmission at 10 Gb/s into practice. In addition, an optical transmission system at the transmission speed 40 Gb/s has been under development. Further, there has been developed an optical transmission system in which 1000-multiplexed optical signals with a bit rates of 10 Gb/s are multiplexed in use of a wavelength multiplexing technique and the resultant wavelength-multiplexed signal is collectively amplified and transmitted.

In conjunction with enhancement in transmission speed, chromatic dispersion of an optical fiber intensifies deterioration in waveform of an optical signal and is therefore one of the causes of the restriction on transmittable distances. For this reason, a dispersion compensation fiber that compensates such chromatic dispersion of an optical fiber makes long distance transmission as far as several hundreds kilometers possible. Since the transmission speed further increased to approximately 40 Gb/s causes chromatic dispersion to more largely impinges, realization of long distance transmission as far as several hundreds kilometers prefers exact compensation for chromatic dispersion of an optical fiber and concurrently cannot neglect a variation in chromatic dispersion characteristics caused from a variation in temperature of the optical fiber and a variation in chromatic dispersion caused from polarization mode dispersion.

Optical transmission at a high transmission speed, such as 40 Gb/s as above, higher than at 10 Gb/s, tightens the restriction on the tolerance of chromatic dispersion, which accompanies desire for strict conditions on a residual amount of chromatic dispersion obtained after the chromatic dispersion has been compensated for. Therefore, dispersion has to be compensated for which is caused by a variation in temperature of an optical fiber and by polarization mode dispersion in order to reduce residual chromatic dispersion while the apparatus is in operation.

Various approaches have conventionally been proposed in order to compensate chromatic dispersion. For example, FIG. 7 is a diagram illustrating a conventional technique including a dispersion compensator, in which the drawings illustrates optical receiver 100, wavelength compensator 101, optical filter 102, optical-to-electrical converter (O/E) 103, data identifying section 104 with clock regenerating means, error detector 105, error rate calculator 106, error-rate variation amount calculator 107, compensation amount calculator 108, and dispersion compensating unit 111 placed at a distance.

Optical receiver 100 receives optical signal transmitted through an optical fiber; dispersion compensator 101 compensates chromatic dispersion of the received optical signal; optical filter 102 extracts an optical signal containing a signal components; optical-to-electrical converter 103 converts the extracted optical signal into an electric signal; data identifying section 104 extracts the clock (from the electric signal), identifies the data on the basis of the extracted clock, and inputs the data into error detector 105; and error detector 105 carries out error detection or error correction and outputs the data, serving as a received signal, to a subsequent apparatus which is however not illustrated in the drawing.

Error rate calculator 106 calculates an error rate based on an error detection signal of error detector 105 and error-rate variation amount calculator 107 calculates a variation in error ratio and inputs the error ratio into compensation amount calculator 108, which calculates an amount of dispersion control and controls dispersion compensator 101. Specifically, compensation amount calculator 108 controls the amount of dispersion control to be used in dispersion compensator 101 such that the error ratio is not increased.

The optical receiver 100 is configured to search, on the basis of signal quality information, such as error ratio, calculated from an optical signal transmitted through the optical transmission line serving as a connection path for an amount of dispersion control to be used in dispersion compensator 101 and sets the searched amount of dispersion control into dispersion compensator 101 at the initial setting stage (until communication has been established between a non-illustrated optical transmitter and optical receiver 100). Described in detail, optical receiver 100 sweeps a range of an amount of dispersion control variable in dispersion compensator 101 and successively measures the error ratio associated with the amount of dispersion control, and finally sets the amount of dispersion control associated with the most preferable error ratio into dispersion compensator 101.

Here, dispersion compensator 101 is exemplified by a configuration in which optical or mechanical variation in length of a dispersion compensation fiber controls an amount of dispersion control or a configuration in which a heater that searches for the temperature by supplying electricity corresponding to an amount of dispersion compensation is provided on the basis of knowledge of a temperature variation varying an amount of chromatic dispersion. Either configuration of a dispersion compensator requires tens of milliseconds or more to respond to, for example, a single control. Accordingly, it means that sweeping a compensatable range requires, for example, time as long as tens of seconds or more.

Therefore, if an amount of dispersion control is searched for in such a method, sweeping performed in search of an amount of dispersion control by dispersion compensator 101 usually requires relatively long time, optical receiver 100 requires a certain time for searching for an amount of dispersion control in order to secure a desired signal quality.

In other words, reduction in time required for the initial setting need reduction in time required for searching for the desired amount of dispersion control to be set.

Patent reference 1 sweeps a variable range at the initial setting to calculate a bit error rate and concurrently carries out synchronization detection such as frame synchronization. The disclosed configuration enhances the speed of searching for a amount of dispersion control by setting, sweeping the width of a range in which synchronization detection cannot be carried out larger than that of the range in which synchronization detection can be carried out.

The technique disclosed in Patent Reference 2 can be listed among conventional techniques related to the present invention.

[Patent Reference 1] Japanese Patent Application Laid-Open (KOKAI) No. 2004-236097

[Patent Reference 2] Japanese Patent Application Laid-Open (KOKAI) No. 2002-208892

However, even the technique disclosed in above Patent Reference 1 requires sweeping a range at least from the lower limit to the upper limit of the variable range of the dispersion compensator. Therefore, it is difficult for the technique to satisfactorily enhance the searching speed for an amount of dispersion control.

If the compensation at even the amount of dispersion control initially set in the dispersion controller worsens the error rate or the like due to a variation in temperature of the optical fiber, polarization mode dispersion and/or other reasons, another sweeping has to be made search of an amount of dispersion control of the dispersion compensator. The sweeping which likewise requires a relatively long time needs be repetitiously carried out even during the operation, and consequently a variation in temperature of the optical fiber, polarization mode dispersion and/or other reasons make it difficult to set a stable amount of dispersion control.

Further, as described below, it is problematically difficult to optimally compensated for dispersion caused by a phenomenon peculiar to optical transmission, that is, fluctuation in level of an optical input (i.e., fluctuation in Optical signal to Noise Ratio (OSNR)) and fluctuation in characteristics of Polarization Mode dispersion (PMD).

Specifically, dispersion of an optical signal being received by an optical receiver is represented by values on the x axis and Q penalty of the same optical signal is represented by values on the y axis, a dispersion value close to the center of abscissa is associated with a lower Q penalty value (i.e., representing more preferably quality) and the Q penalty value increases (i.e., the quality deteriorates) as departing from the center of abscissa (i.e., as the dispersion value decreases or increases from the center value). Namely, the relationship between the dispersion and the Q penalty of an optical signal in this case is represented by a parabola waveform (a tolerance curve) having the bottom at the center thereof.

In this case, fluctuation in light input level on the time axis causes the characteristics of OSNR to irregularly fluctuate on the time axis. For this reason, the waveform representing the relationship between the dispersion and Q penalty value varies with time in the y-axis direction (up and down) as illustrated in, for example, FIG. 8. In addition, the characteristics of PMD possessed by the optical transmission path varies on the time axis, so that the waveform representing the relationship between the dispersion and the Q penalty of the optical signal varies with time in the x-axis direction as illustrated in, for example, FIG. 9.

The fluctuation in characteristics of PMD and that of OSNR are not associated with each other, so that the combination of both fluctuations does not substantially vary in gradient of the tolerance curve but does randomly shifts on both x and y axes as illustrated in, for example, FIGS. 10 and 11 (see tolerance curves TC1 to TC6 in FIG. 10 and tolerance curves TC11 to TC16 in FIG. 11). Here, FIG. 10 shows an example of a shift in tolerance curve of receipt of an optical signal having transmission speed of 10 Gbit/s and FIG. 11 shows an example of a shift in tolerance curve of receipt of an optical signal having transmission speed of 40 Gbit/s.

As illustrated in FIGS. 10 and 11, the optimum amount of dispersion control when the optical receiver receives an optical signal and the Q penalty values corresponding to the optimum amount that are representing the coordinates at the bottom of a tolerance curve randomly shift on the xy coordinates. Further, an optical signal at a transmission speed as high as 40 Gbit/s has a narrower width than that of a transmission speed of about 10 Gbit/s and therefore has a stricter demand for dispersion.

FIGS. 12 and 13 show a relationship between the dispersion tolerance width and Q penalty values of an optical signal respectively at transmission speeds of 10 Gbit/s and 40 Gbit/s. Trapezoids L1 and L2 in FIGS. 12 and 13 represent a coordinate region defined by a dispersion value and a Q penalty value which can establish communication even under the influence of variations in OSNR and PMD.

As illustrated in FIG. 12, in receipt of an optical signal at a transmission speed of 10 Gbit/s, the width (i.e., the dispersion tolerance width) of dispersion value that can ensure communication establishment even if the tolerance curve shifts as illustrated in above FIG. 10 has a small variation with the variation in Q penalty value represented by the ordinate.

Namely, since the variation in Q penalty from the finest value Q11 to limit value Q12 in trapezoid L1 illustrated in FIG. 12 is followed by the variation in dispersion width from the lower base length L11 of trapezoid L1 to the upper base length L12 of trapezoid L2, dispersion tolerance has a small amount of variation in accordance with a variation in Q penalty (in other words, the slope of right oblique L13 and that left oblique L14 of trapezoid L1 with respect to variation in the ordinate direction are gentle).

In contrast, as illustrated in FIG. 13, in receipt of an optical signal at a transmission speed of 40 Gbit/s, the width (i.e., the dispersion tolerance width) of dispersion value that can ensure communication establishment when the tolerance curve shifts as illustrated in above FIG. 11 has a relatively large variation with the variation in Q penalty value represented by the ordinate.

Namely, since the variation in Q penalty from the finest value Q21 to limit value Q22 in trapezoid L2 illustrated in FIG. 13 is followed by the variation in dispersion width from the lower base length L21 of trapezoid L2 to the upper base length L22 trapezoid L2, dispersion tolerance has a large amount of variation in accordance with a variation in Q penalty (in other words, the slope of right oblique L23 and left oblique L24 of trapezoid L2 with respect to the ordinate direction are sharp).

As described above, for an optical signal transmitted at the transmission speed 40 Gbit/s, even if the OSNR value is fine because a dispersion value corresponding to either end of the lower base of trapezoid L2 in FIG. 13 is applied to the optical signal, deterioration in Q penalty value caused from a variation in OSNR due to the variation in PMD or the like as illustrated by arrow A in FIG. 13 causes the Q value to deviate from the dispersion tolerance width, so that the communication may not be secured.

Here, as illustrated by arrow B in FIG. 13, the Q penalty even which deteriorates due to PMD fluctuation or the like may remain inside the dispersion tolerance. However, as another problem, on the basis of the OSNR value in a stationary state, whether or not the deterioration in Q penalty shifts the Q penalty to an error region as illustrated by arrow A or to a region in which an error does not occur as illustrated by arrow B.

In short, the problem is also that, in spite of a preferable OSNR value, an optical signal with a transmission speed of 40 Gbit/s may have errors caused not only by narrowing the dispersion tolerance width but also by sharpening the variation in dispersion tolerance according to deterioration in Q penalty value.

In other words, as increasing in bit rate from about 10 Gbit/s to about 40 Gbit/s, the setting of dispersion of optical signal that are capable of establishing communication becomes more sensitive to OSNR, PMD and the like, and therefore, dispersion compensation requires higher accuracy.

The Patent Reference 2 discloses a technique with a configuration that chirps an optical signal at an optical transmitter in advance to compensate for both chromatic dispersion and polarization dispersion at an optical receiver. However, since the technique of the Patent Reference 2 assumes that an optical signal that is to be compensated for previously undergoes a particular process of being chirped at an optical transmitter, the Patent Reference 2 does not provide a technique to rapidly set an amount of compensation for chromatic dispersion which amount minimizes the influence of a variation in temperature of an optical fiber and the influence of PMD without depending on whether or not an optical signal to be received has been chirped.

SUMMARY

Accordingly it is an object of the present invention is to enhance the speed of searching for an amount of dispersion control as compared with a conventional technique.

Further, another object is to rapidly setting an amount of dispersion control which minimizes the influence by a variation in temperature of an optical fiber and by polarization mode dispersion of the optical fiber even if an optical signal being received does not under go a process to compensate for polarization mode dispersion.

In order to attain the objects, there is provided a dispersion compensation controlling apparatus including: a dispersion controller dealing with a variable amount of dispersion compensation used to compensate for waveform deterioration of an input optical signal; a quality index generator generating a quality index representing a quality of an optical signal output from the dispersion controller; and a searching unit searching for an amount of dispersion control used by the dispersion controller which amount optimizes the signal index generated by the quality value generator, wherein the searching unit comprises, a splitting-half searching unit roughly searching, in a splitting half method, a range in which dispersion is controllable by the dispersion controller for an amount of dispersion control such that the quality index generated by the quality index generator becomes preferable, and a sweep searching unit thoroughly searching, by sweeping, a limited range based on the amount of dispersion searched by the splitting-half searching unit for an amount of dispersion control that optimizes the quality index generated by the quality index generator.

Further, there is provided a method for searching for an amount of dispersion control performed by a searching unit included in a dispersion compensation controlling apparatus including a dispersion controller dealing with a variable amount of dispersion compensation used to compensate for waveform deterioration of an input optical signal, a quality index generator generating a quality index representing a quality of an optical signal output from the dispersion controller; and the searching unit searching for an amount of dispersion control used by the dispersion controller which amount optimizes the signal index generated by the quality value generator, the method comprising: in an initial setting, roughly searching in a splitting half method a range in which dispersion is controllable by the dispersion controller for an amount of dispersion control that optimizes the quality index generated by the quality index generator; and thoroughly searching, by sweeping, a limited range based on the amount of dispersion searched for as the result of the roughly searching for an amount of dispersion control that optimizes the quality index generated by the quality index generator.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

Figure 1:
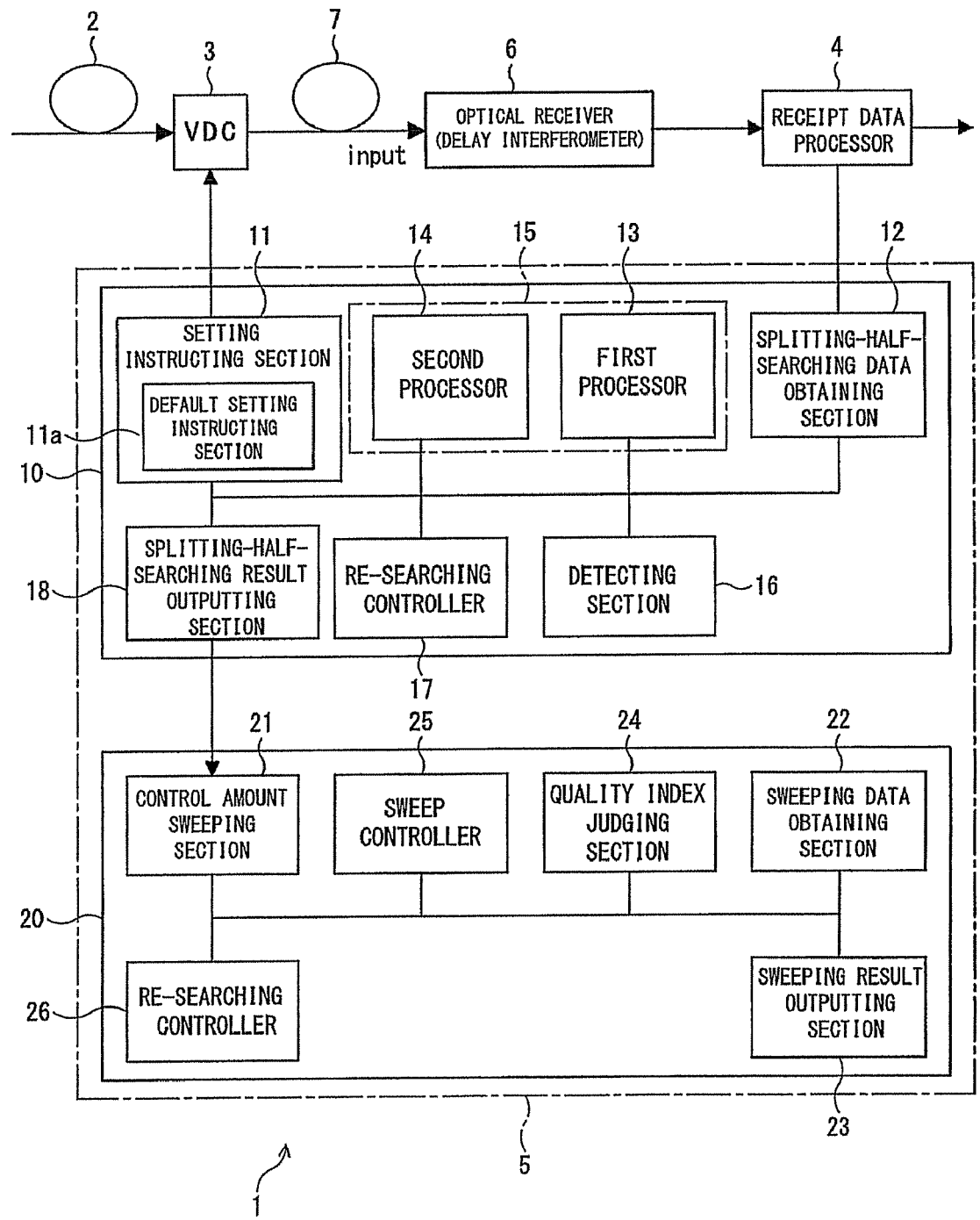
FIG. 1 A block diagram showing a dispersion compensation controlling apparatus according to an embodiment.

DESCRIPTION OF REFERENCE NUMBERS 1 dispersion compensation controlling apparatus
2 optical transmission path
3 VDC (dispersion controller)
4 receipt data processor (quality index generating unit)
5 searching unit
6 optical receiver
7 optical fiber
10 splitting-half searching unit
11 setting instructing section
11a default setting instructing section
12 splitting-half-searching data obtaining section
13 first processor
14 second processor
15 control amount determining section
16 detecting section
17 re-searching controller 18 splitting-half-searching result outputting section
20 sweep searching unit
21 control amount sweeping section
22 sweeping data obtaining section
23 sweeping result outputting section
24 quality index judging section
25 sweep controller
26 re-searching controller
100 optical receiver
101 dispersion compensator
102 optical filter
103 optical-to-electrical (O/E) convertor
104 data identifying section including clock regenerating section
105 error detector
106 error rate calculator
107 error-rate variation amount calculator
108 compensation amount calculator
111 dispersion compensating unit

DESCRIPTION OF EMBODIMENTS(S)

Hereinafter, an embodiment of the present invention will now be described with reference to the accompanying drawings.

FIG. 1 is a block diagram showing a dispersion compensation controlling apparatus according to a first embodiment. Dispersion compensation controlling apparatus 1 illustrated in FIG. 1 compensates for deterioration in waveform of a received optical signal which deterioration is caused by the chromatic dispersion characteristics of optical transmission path 2. Dispersion compensation controlling apparatus 1 includes Variable Dispersion Compensator (VDC) 3 serving as a dispersion controller, receipt data processor 4 serving as a quality index generating unit, and searching unit 5.

VDC 3 compensates, before a process is performed to receive an optical signal in optical receiver 6, for deterioration in waveform due to the chromatic dispersion characteristics of optical transmission path 2 by control a dispersion of the optical signal being input at a variable amount of dispersion control. Such an amount of dispersion control of VDC 3 is determined by searching unit 5 that is to be detailed below.

Figure 7:
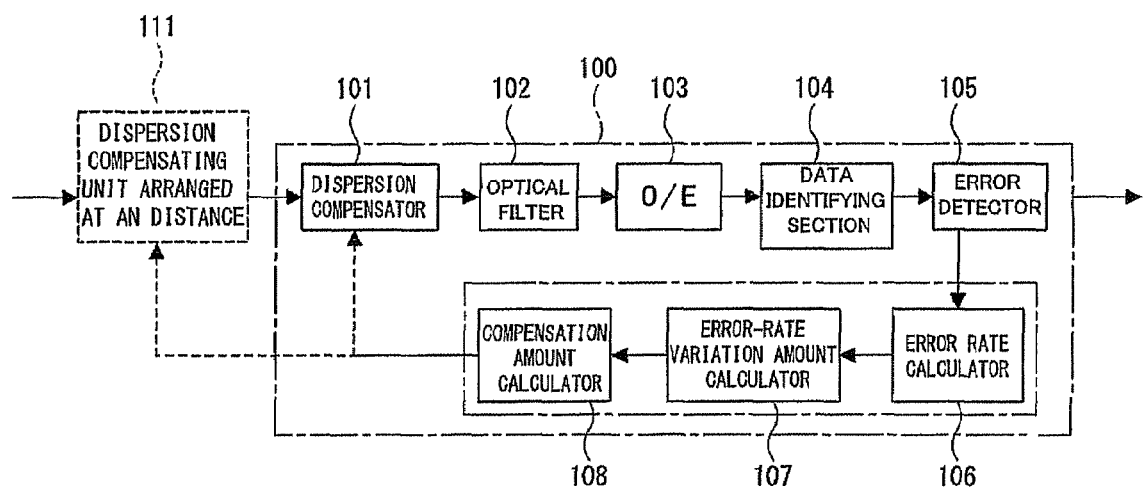
FIG. 7 A block diagram showing a conventional technique.
Figure 8:
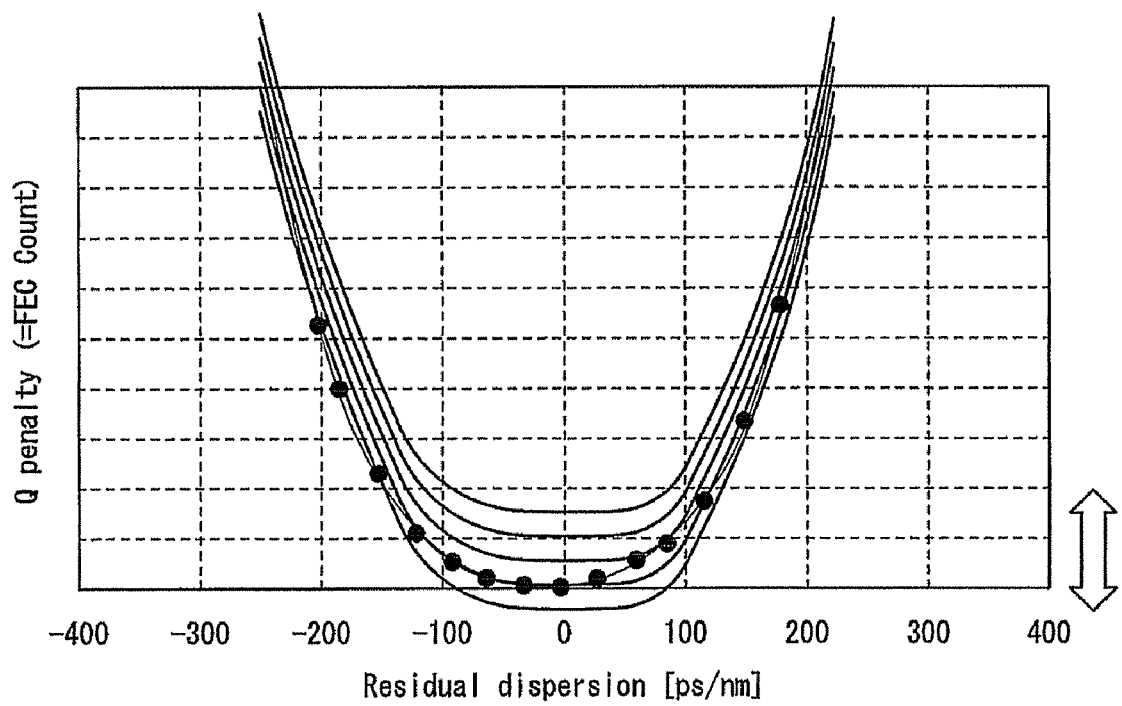
FIG. 8 A diagram showing a variation in waveform related to dispersion and a Q penalty value of an optical signal with respect to the time axis.
Figure 9:
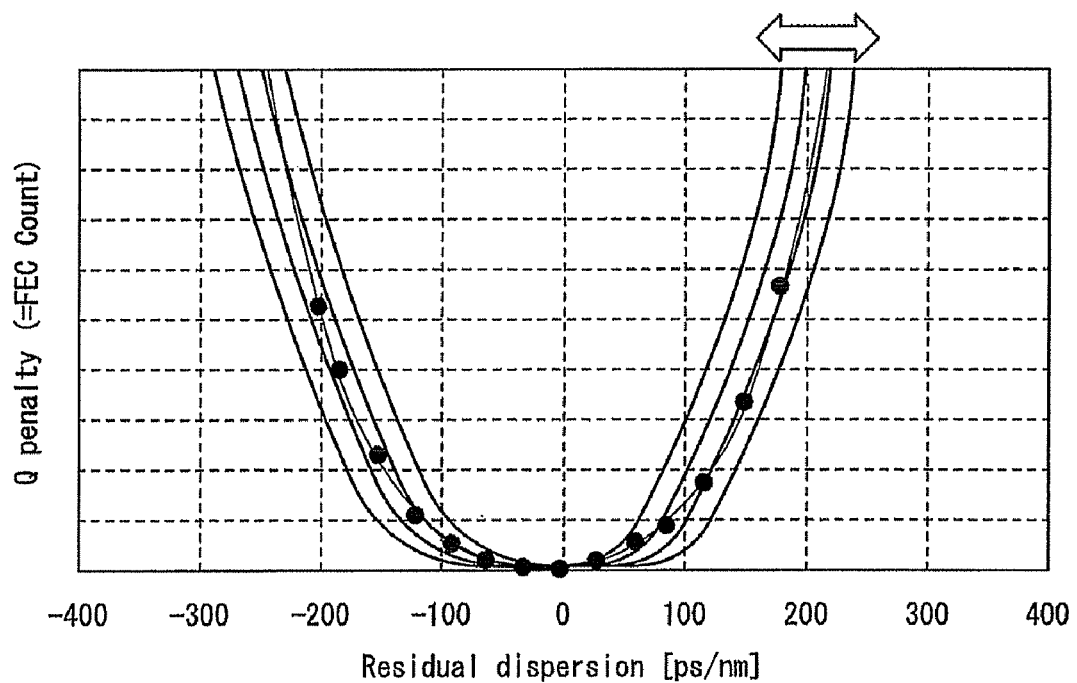
FIG. 9 A diagram showing a variation in waveform related to dispersion and a Q penalty value of an optical signal with respect to the time axis.
Figure 10:
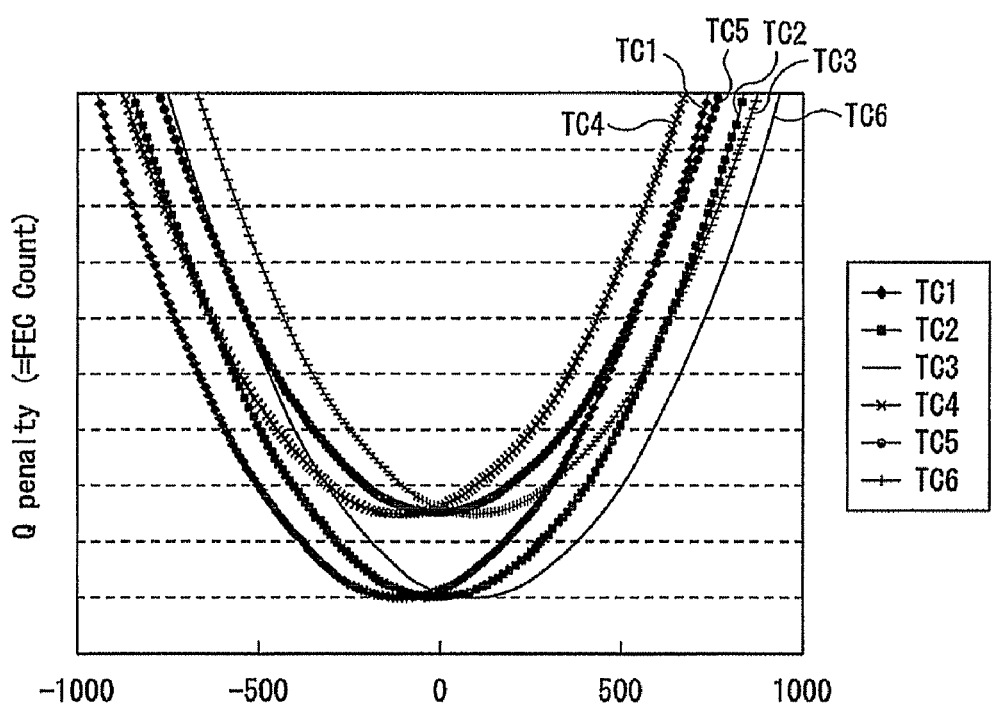
FIG. 10 A diagram showing a variation in waveform related to dispersion of optical signal of 10 Gbit/s and to a Q penalty value with respect to the time axis.
Figure 11:
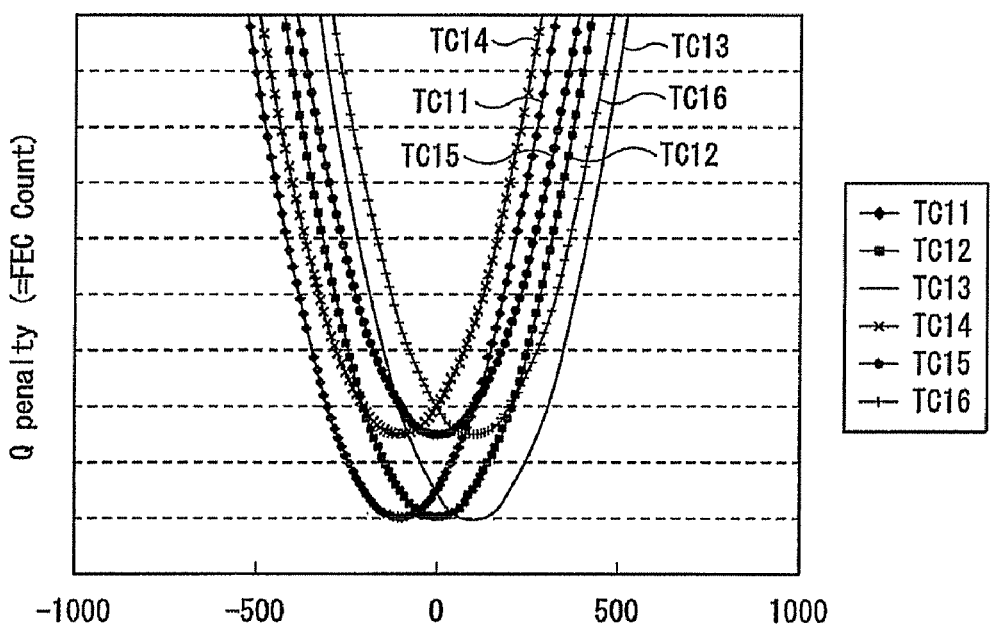
FIG. 11 A diagram showing a variation in waveform related to dispersion of an optical signal of 40 Gbit/s and to a Q penalty value with respect to the time axis.
Figure 12:
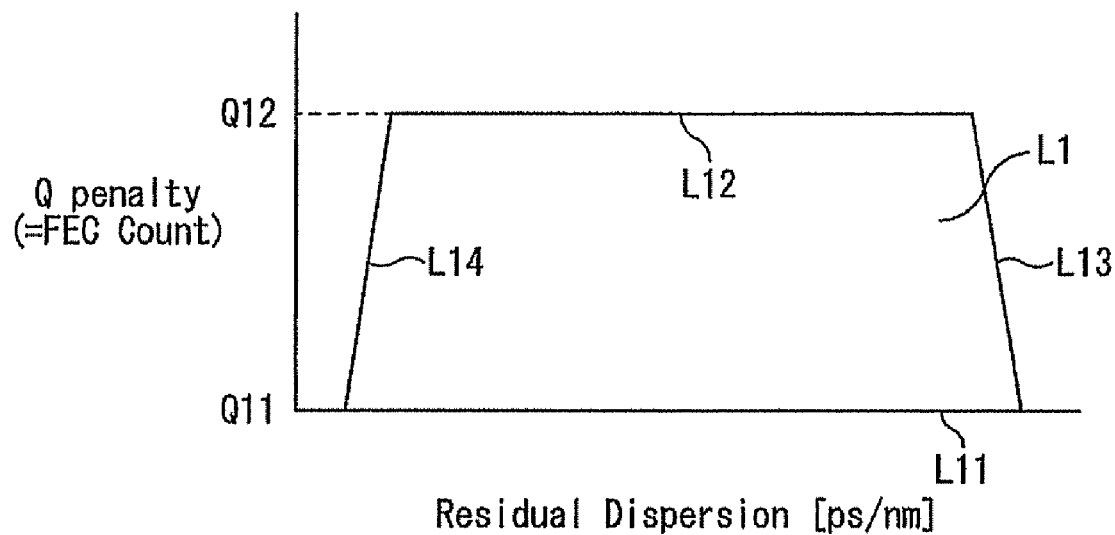
FIG. 12 A diagram showing a relationship between a dispersion tolerance width and a Q penalty value of an optical signal having a transmission speed of 10 Gbit/s.

Similarly to dispersion compensator 101 illustrated in FIG. 7 described above, a known configuration of VDC 3 is, for example, controlling an amount of dispersion compensation by optically or mechanically varying the length of a dispersion compensation fiber, or providing the optical fiber with a heater that searches the temperature by supplying electricity corresponding to an amount of dispersion compensation on the basis of knowledge of a temperature variation varying an amount of chromatic dispersion. VDC 3 in FIG. 1 is installed on the side of optical receiver 6 of optical transmission path 2, but can be arranged at another position on the transmission path, such as on the side of an optical transmitter.

In optical receiver 6, an optical signal that has been subjected to dispersion control in VDC 3 is input through optical fiber 7 or the like, and the received optical signal undergo a conversion to an electric signal or other processes. If the optical signal has undergone differential phase-shift keying, optical receiver 6 properly performs demodulation, such as a delay interference process or an O/E conversion detection, or a clock regeneration process on the optical signal.

Receipt data processor 4 carries out a process regarding the demodulated electric signal from optical receiver 6 as a framer and an error correction process on the demodulated electric signal. At that time, the number of corrected errors, which is information about the error correction process performed in receipt data processor 4 is sent to searching unit 5 to represent a value (a quality index) showing the quality of an optical signal on which VDC 3 has performed compensation for wavelength distortion. Therefore, receipt data processor 4 serves as a quality index generating unit that generates a quality index representing the quality of an optical signal compensated by VDC 3.

Searching unit 5 is formed of an arithmetic operator in the form of a processor or the like and a memory storing therein various settings, programs and others. Searching unit 5 searches for such an amount of dispersion control that optimizes the number of corrected errors, serving as the quality index from receipt data processor 4, and functionally comprises splitting-half searching unit 10 and sweep searching unit 20.

Splitting-half searching unit 10 roughly searches, in the split half method, the range in which dispersion is controllable by VDC 3 for an amount of dispersion control that makes a quality index created by receipt data processor 8 favorable. Sweep searching unit 20 thoroughly searches by sweeping a limited region based on the amount of dispersion control searched by splitting-half searching unit 10 for an amount of dispersion control that optimizes a quality index generated by receipt data processor 4.

In particular, prior to the establishment of communication between optical receiver 6 and an optical transmitter connected to each other through optical transmission path 2, in other words, as the initial setting, splitting-half searching unit 10 roughly searches for an amount of searched dispersion control which optimizes the signal quality. Sweeping (dithering) a limited range based on using the result of the above rough searching by splitting-half searching unit 10 makes it possible to search for an optimum amount of dispersion control in line with the state of optical transmission path 2 much faster than a conventional technique because the range to be swept by dithering can be greatly narrowed as compared with sweeping from the upper limit through the lower limit of the entire dispersion variable width or with sweeping only in the split half method.

After the establishment of the communication, that is, during the operation, the optimum dispersion compensation can be realized by setting into VDC 3 the amount of dispersion control searched for by searching unit 5 in the above manner. In addition, the amount of dispersion control can catch up with the variation factors in signal quality properties by a search that sweep searching unit 20 occasionally carries out after a time period during which the properties of the optimum amount of dispersion control is assumed to fluctuate depending on fluctuation in polarization mode dispersion and in temperature of optical transmission path 2.

In this example, splitting-half searching unit 10 includes setting instructing section 11, splitting-half-searching data obtaining section 12, control amount determining section 15, detecting section 16, re-searching controller 17, and splitting-half-searching result outputting section.

Setting instructing section 11 instructs VDC 3 to set in VDC 3 an amount of dispersion control, which amount is used for capturing a quality index, and includes default setting instructing section 11a that successively sets in VDC 3 two amounts of dispersion control predetermined to be default as the start of searching and a center value of the above two amount determined to be a default center value. The two default amounts of dispersion control on which calculation of the default center value is based can correspond to the lower and upper limits of the dispersion variable width.

Splitting-half-searching data obtaining section 12 sequentially obtains, from receipt data processor 4, the number (a quality index) of corrected errors of an optical signal having waveform deterioration that has been compensated for with an amount of dispersion control set according to an instruction by setting instructing section 11. Further, control amount determining section 15 determines on the basis of the result of the capturing by splitting-half-searching data obtaining section 12 another amount of dispersion control that is to be used in ensuing capture of a quality index by splitting-half-searching data obtaining section 12 in response to a setting instruction of setting instructing section 11. Control amount determining section 15 includes first processor 13 and second processor 14.

First processor 13 determines a center value between the amount of dispersion control associated with the smaller quality index among the two quantities of error corrections related to two amounts of dispersion control set previously to setting of the default center value into VDC 3 and the default center value to be the amount of dispersion control that is to be set in VDC 3 subsequently to the default center value.

In conjunction with determination made in first processor 13, setting instructing section 11 sets the determined amount of dispersion control in VDC 3 subsequently to the default center value; and splitting-half-searching data obtaining section 12 obtains the number of corrected errors associated with the determined amount of dispersion control currently set in VDC 3 from receipt data processor 4.

Second processor 14 determines that an amount of dispersion control that is to be immediately subsequently set in VDC 3 corresponds to a center value between the amount of dispersion control set the latest and the amount of dispersion control associated with the lesser corrected errors among two amounts of dispersion control set immediately previously to the latest amount of dispersion control to be until the difference between the latest amount of dispersion control and the amount of dispersion control set immediately previously to the latest amount of dispersion control in VDC 3 becomes equal to or smaller than a predetermined difference threshold or becomes smaller than the predetermined difference threshold.

In accordance with the determination made in second processor 14, setting instructing section 11 sets into VDC 3 an amount of dispersion control; and splitting-half-searching data obtaining section 12 obtains from receipt data processor 4 the number of corrected errors related to the above set amount of dispersion control.

Detecting section 16 detects the amount of dispersion control associated with the preferable number of corrected errors among all the amounts of dispersion control set in VDC 3 by going back to the default amounts of dispersion control when the difference between a latest amount of dispersion control and the amount of dispersion control set immediately previously to the same latest amount of dispersion control in VDC 3 becomes the predetermined difference threshold or smaller, or becomes smaller than the predetermined difference threshold.

In other words, control amount determining section 15 determines an amount of dispersion control having a smaller difference from the amount of dispersion control set immediately previously in VDC 3 as proceeding of the searching in splitting-half searching unit 10. Therefore, in addition to the determination of an amount of dispersion control that is to be used to capture a subsequent number of corrected errors, second processor 14 judges whether or not the searching is resolute enough to be granted that the roughly searching is completed on the basis of comparison of largeness between the difference of a latest amount of dispersion control to be set in VDC 3 by an instruction of setting instructing section 11 from the amount of dispersion control set immediately previously to the latest amount of dispersion control and the difference threshold. Thereby, an amount of dispersion control is subsequently input into VDC 3 in order to obtain an ensuing number of corrected errors until the difference between two latest amounts of dispersion control set in VDC 3 becomes smaller than the predetermined difference threshold.

When the difference described above comes to be smaller than the difference threshold, the amount of dispersion control set in VDC 3 last is expected to have the most preferable in signal quality as the result of the split half method. However, there is possibility that the amount of dispersion control which has been selected the last deteriorates because of fluctuation in dispersion properties of optical transmission path 2 caused from PMD during the searching in splitting-half searching unit 10.

For this reason, detecting section 16 determines an amount of dispersion control associated with the most preferable quality index (which has been captured by splitting-half-searching data obtaining section 12) from all the amounts of dispersion controls set by instruction of setting instructing section 11 to be an amount of dispersion control that is expected to make the signal quality the most preferable in line with the latest characteristics of optical transmission path 2.

Further, splitting-half-searching result outputting section 18 outputs to sweep searching unit 20 the result of the search performed in splitting-half searching unit 10 based on the amount of dispersion control determined by detecting section 16. For example, search performed in sweep searching unit 20 can be activated by outputting the determined amount of dispersion control by detecting section 16 which amount is serving as a searching result to sweep searching unit 20.

Alternatively, until splitting-half-searching result outputting section 18 outputs a predetermined number of searching results as many as the number predetermined by detecting section 16, splitting-half-searching result outputting section 18 operate setting instructing section 11, splitting-half-searching data obtaining section 12, control amount determining section 15, and detecting section 16 to repeat searching in the split half method, and may calculate the average of the searching results output from detecting section 16 and output the average obtained as a result of the calculation to sweep searching unit 20, which in response starts searching.

Specifically, if fluctuation in dispersion characteristics of optical transmission path 2 caused from PMD affects one or more amounts of dispersion control detected by detecting section 16, the search result in the form of the average of the search results can rough the influence caused from the PMD.

Re-searching controller 17 does not output the search result based on the amount of dispersion control detected from splitting-half-searching result outputting section 18 and does controls setting instructing section 11 for search in the split half method by causing default setting instructing section 11a to set into VDC 3 another amount of dispersion control if an optical correction which has undergone compensation for waveform deterioration at the amount of dispersion control detected by detecting section 16 has error correction larger in quantity than a predetermined re-search threshold.

The predetermined re-search threshold can be considered as the upper limit (e.g., the maximum number of errors which can be corrected in receipt data processor 4) of the number of corrected errors which secures establishment of communication between an optical transmitter and optical receiver 6 connected to each other through optical transmission path 2. In other words, since such an amount of dispersion control, even though having been determined by detecting section 16, cannot secure the establishment of the connection, another search is carried out to find an amount of dispersion control that can secure establishment of the communication if the dispersion characteristic is regained while the re-searching.

Sweep searching unit 20 includes control amount sweeping section 21, sweeping data obtaining section 22, sweeping result outputting section 23, quality index judging section 24, sweep controller 25, and re-searching controller 26.

Control amount sweeping section 21 sweeps (dithers) a limited range determined on the basis of the amount of dispersion control searched by splitting-half searching unit 10 at predetermined step widths in search of an amount of dispersion amount in such a direction that an amount of dispersion control increases or decreases. Sweeping data obtaining section 22 captures from receipt data processor 4 the number of corrected errors serving as a quality index associated with the amount of dispersion control swept in control amount sweeping section 21.

The above limited range for searching by sweep searching unit 20 can be determined, so as to actually cover a width of dispersion amount that can be expected to be the variation width in optimum amount of dispersion control caused from polarization dispersion. Even a dispersion value width so as to include such a dispersion value width can be satisfactorily narrower than the width between two default amounts of dispersion control that is used when initiation of search in splitting-half searching unit 10.

Sweeping result outputting section 23 detects an amount of dispersion control related to the most preferable number of error correction captured by sweeping data obtaining section 22 over the range swept by control amount sweeping section 21 in search of an amount of dispersion control, and outputs the detected amount to serve as the searching result. Quality index judging section 24 judges whether or not the individual number of corrected errors obtained by sweeping data obtaining section 22 reaches a predetermined preferable quality standard and concurrently judges whether or not the individual number of corrected errors exceeds a sweeping termination standard, beyond which there is no requirement for continuation of the sweeping in the above direction any longer.

Sweep controller 25 ceases the sweeping in the above direction being performed by control amount sweeping section 21 if quality index judging section 24 judges that the captured quality index exceeds the sweeping termination standard, whereas cease the sweeping of an amount of dispersion control being performed by control amount sweeping section 21 even when the sweeping over the entire limited range has not completed if the captured number of corrected errors is judged to have reached the preferable quality standard or if control amount sweeping section 21 completes or terminates the sweeping in both the increasing and decreasing direction.

Sweeping result outputting section 23 detects the amount of dispersion control associated with the most preferable number of corrected errors within the range swept by control amount sweeping section 21 in search of amounts of dispersion control when sweep controller 25 stops control amount sweeping section 21 from sweeping, and outputs the detected amount of dispersion control being regarded the result of the searching. The result of the searching output from sweeping result outputting section 23 is set into VDC 3 and is used to optimize the dispersion compensation for optical signals received during the subsequent operation.

Re-searching controller 26 controls sections 21-25 to perform two successive cycles of searching such a detected amount of dispersion control, and judges whether or not the absolute difference between the two detected amounts DSy and DSy-1 of dispersion control exceeds a threshold ΔDth for researching used in sweep searching unit 20. If the absolute difference between the two detected amounts DSy and DSy-1 of dispersion control does not exceed the predetermined re-searching threshold ΔDth for use in sweep searching unit 20, re-searching controller 26 outputs the latest amount DSy of dispersion control serving as the result of the searching performed in sweep searching unit 20 and terminates a series of searching. Conversely, if the absolute difference exceeds the re-searching threshold ΔDth, re-searching controller 26 controls sections 21-25 in order to perform another search.

The thresholds described above can be stored in the form of a table in a non-illustrated memory.

Description will be made in relation to detailed searching operations performed in searching unit 5 of dispersion compensation controlling apparatus 1 having the configuration described above with reference to flow charts FIGS. 2 and 3.

Figure 2:
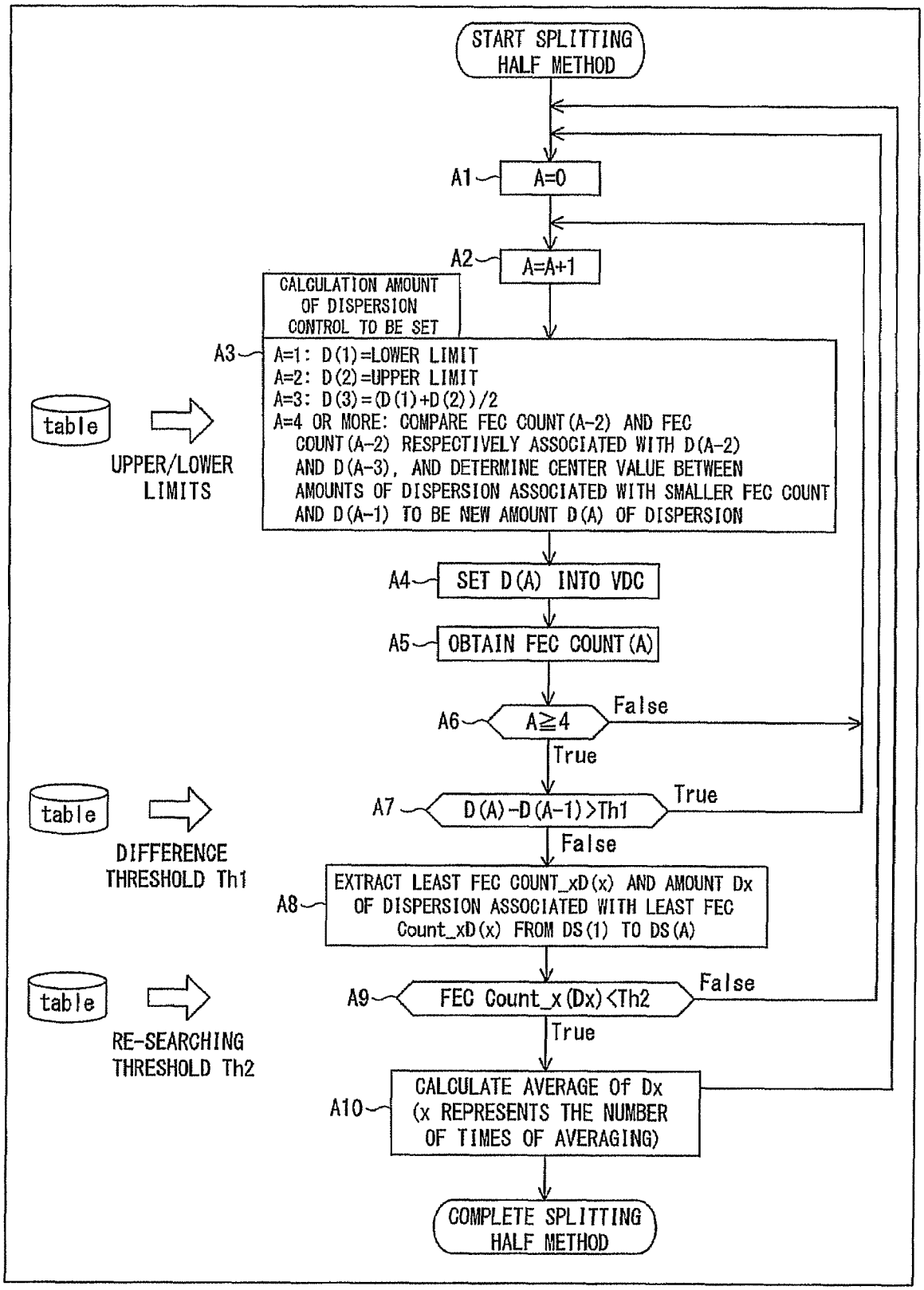
FIG. 2 A flow chart showing an operation performed in the first embodiment.
Figure 3:
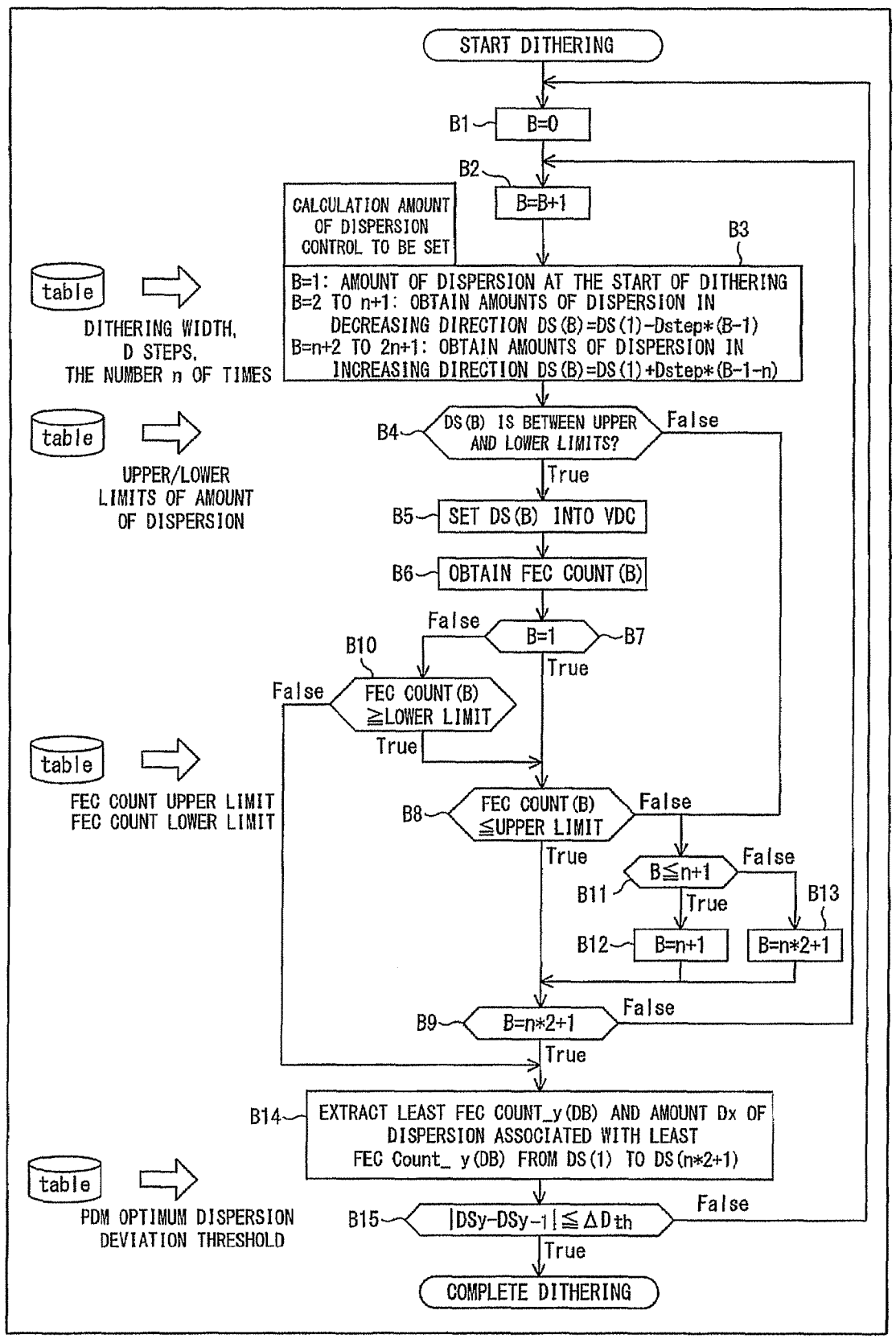
FIG. 3 A flow chart showing an operation performed in the first embodiment.

In the initial setting operation performed prior to establishment of communication, splitting-half searching unit 10 first roughly searches controllable range in which VDC 3 is able to control dispersion for an amount of dispersion control which optimizes the number of corrected errors to be generated by receipt data processor 4, as illustrated in flow chart FIG. 2; and sweep searching unit 20 then thoroughly searches, by sweeping, the limited range based on the amount of dispersion control obtained as the result of the roughly searching in splitting-half searching unit 10 for an amount of dispersion control which optimizes the number of corrected errors to be generated by receipt data processor 4, as illustrated in flow chart FIG. 3, so that a fine adjustment is made on the amount of dispersion control roughly searched for in splitting-half searching unit 10.

In searching in the splitting half method as illustrated in flow diagram FIG. 2, a single searching cycle involves detection of a single amount of dispersion control by detecting section 16, and additionally involves introduction of variable A representing the number of times that setting instructing section 11 issues a setting instruction to VDC 3 in a single searching cycle.

Upon start the search in splitting-half searching unit 10, variable A at the initial setting value "0" (step A1) is increased by one (step A2) and setting instructing section 11 sets one of the default amounts of dispersion control. In this case, a limit of the variable width of dispersion control by VDC 3 is set to be the default amount D(1) of dispersion control (steps A3 and A4).

After the default amount D(1) of dispersion control is set into VDC 3, splitting-half-searching data obtaining section 12 obtains from receipt data processor 4 FEC Count(1) representing the number of corrected errors serving as the signal quality index at the set amount of dispersion control (step A5). Here, D(x) represents the x-th amount of dispersion control (A=x), and FEC Count (x) represents the number of corrected errors associated with the x-th amount of dispersion control.

Next, variable A is set to be two (A=2) ("False" route from step A6 to step A2), and substantially similarly to the above case of A=1, the upper limit of the variable width of dispersion control by VDC 3 is set to be the default amount D(2) of dispersion control (steps A3 and A4). Then, FEC Count(2) representing the number of corrected errors associated with the signal quality index after the setting of the default amount D(2) in VDC 3 is obtained from receipt data processor 4 (step A5).

Since splitting-half searching unit 10 searches the range between the default amount D(1) of dispersion control being the lower limit and the default amount D(2) of dispersion control being the upper limit for the optimum amount of dispersion control for an optimum amount of dispersion control, these default amounts D(1) and D(2) of dispersion control are determined to be values between which an optimum amount of dispersion control can be searched for, in other words, for example, can be regarded as the lower limit and the upper limit of the variable range of dispersion control by VDC 3.

Subsequently, variable A is set to be three (A=3) ("False" route from step A6 to step A2), setting instructing section 11a included in setting instructing section 11 determines a center value {D(1)+D(2)}/2 between D(1) and D(2) to be default center value D(3), which is then set in VDC 3 (step A3, step A4). After that, FEC Count(3) representing the number of corrected errors associated with the signal quality index after the setting of the amount D(3) in VDC 3 is obtained by splitting-half-searching data obtaining section 12 from receipt data processor 4 (step A5).

Then variable A is set to be four (A=4) ("False" route from step A6 to step A2), first processor 13 in control amount determining section 15 compares FEC Count(2) associated with amount D(2) of dispersion control and FEC Count (1) associated with amount D(1) of dispersion control, and determines a center value between the amount of dispersion control associated with the smaller EFC Count among amounts D(1) and D(2) and amount D(3) of dispersion control representing a center value between amounts D(1) and D(2) of dispersion control to be amount D(4) of dispersion control, which is then set into VDC 3 (steps A3 and A4). After that, splitting-half-searching data obtaining section 12 captures from receipt data processor 4 FEC Count (4) representing the number of corrected errors associated with the signal quality index after the setting of the amount D(4) in VDC 3 (a first procedure step A5).

After that ("True" route in step A6), second processor 14 repeats the procedure of: setting, into VDC 3, an amount of dispersion control which amount corresponds to a center value between a latest amount of dispersion control and one of the two amounts of dispersion control set immediately previously to the latest amount of dispersion control which is associated with the smaller number of corrected errors; and concurrently capturing from receipt data processor 4 the number of error correction associated with the set amount of dispersion control (a second procedure, "True" route from step A7 to step A2, step A3), until the difference between the latest amount of dispersion control and the amount of dispersion control set immediately previously to the last amount becomes smaller than (otherwise, equal to or smaller than) a predetermined difference threshold Th1.

For example, if the difference between a latest amount D(4) of dispersion control and the amount D(3) of dispersion control set immediate previously to setting of the latest amount D(3) is larger than the predetermined difference threshold Th1, a center value between the latest amount D(4) of dispersion control and the smaller one of the two amounts D(2) and D(3) of dispersion control set immediate previously to setting of the latest amount D(4) of dispersion control is determined to be amount D(5) of dispersion control, which is then set in VDC 3, and FEC Count(5) representing the number of corrected errors associated with the set amount D(5) of dispersion control is captured from receipt data processor 4 ("True" route from step A7 to A2, step A3).

When the difference between a latest amount D(A) of dispersion control and the amount D(A−1) of dispersion control set immediate previously to setting of the latest amount D(A) comes to be smaller than the predetermined difference threshold Th1, the current search in the split half method is judged to reach the object resolution and is terminated. Then the procedure shifts to extraction of the optimum control amount.

Specifically, detecting section 16 refers back to the default amounts of dispersion control and detects an amount Dx of dispersion control resulting in the most preferable quality index from all the amounts D(1)-D(A) of dispersion control that have been set and FEC Count_x(Dx) representing the number of corrected errors associated with the amount D(x) (the third procedure, "False" route from step A7 to step A8). Dx represents the amount of dispersion control set for the x-th time in the split half method and is also the optimum amount of dispersion control, and FEC Count_x(y) represents the number of corrected errors at amount y of dispersion control set for the x-th time in the split half method.

Figure 4:
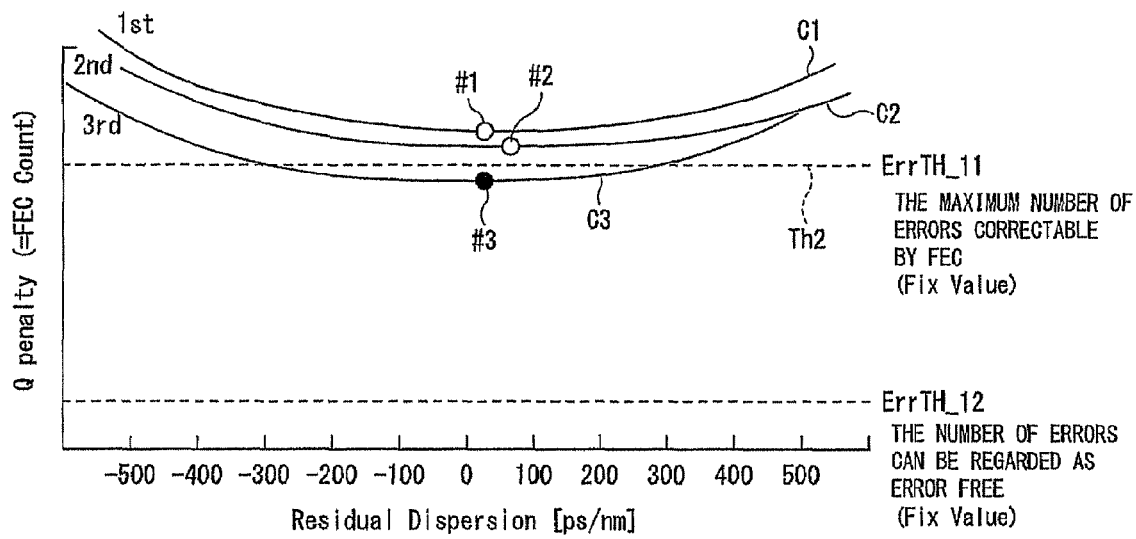
FIG. 4 A diagram showing an operation performed in the first embodiment.

If an amount of dispersion control detected by detecting section 16 is larger than a predetermined re-searching threshold Th2, another amount of dispersion control is re-searched for in the same split half method under the control of re-searching controller 17 ("False" rout from step A9 to step A1). For example, if point #1 on tolerance curve C1 is detected as the result of the first cycle of searching in splitting-half searching unit 10 as illustrated in FIG. 4, another amount of dispersion control is searched for under control of re-searching controller 17 because the number (FEC Count) of corrected errors associated with point #1 is larger in value than the re-searching threshold Th2 (see ErrTH_11 in FIG. 4).

However, since the subsequent second cycle of the search detects point #2 on tolerance curve C2, which point has the number of corrected errors larger than re-searching threshold Th2, the re-search result cannot be output to splitting-half-searching result outputting section. In this case, the third cycle of the search finally succeeds in searching for point #3 (on tolerance curve C3), which has the number of corrected errors larger than re-searching threshold Th2.

Splitting-half-searching result outputting section 18 operates setting instructing section 11, splitting-half-searching data obtaining section 12, control amount determining section 15, and detecting section 16 so that the searching is repetitiously performed in the split half method until a specific number x of searching results are output which number is determined by detecting section 16 in advance. Splitting-half-searching result outputting section 18 calculates the average of such a specific number of searching results output from detecting section 16, and the result of the average calculation serving as the result of the searching is output to VDC 3 from sweep searching unit 20 to thereby start a search process in sweep searching unit 20 (the fourth procedure, step A10).

Figure 5:
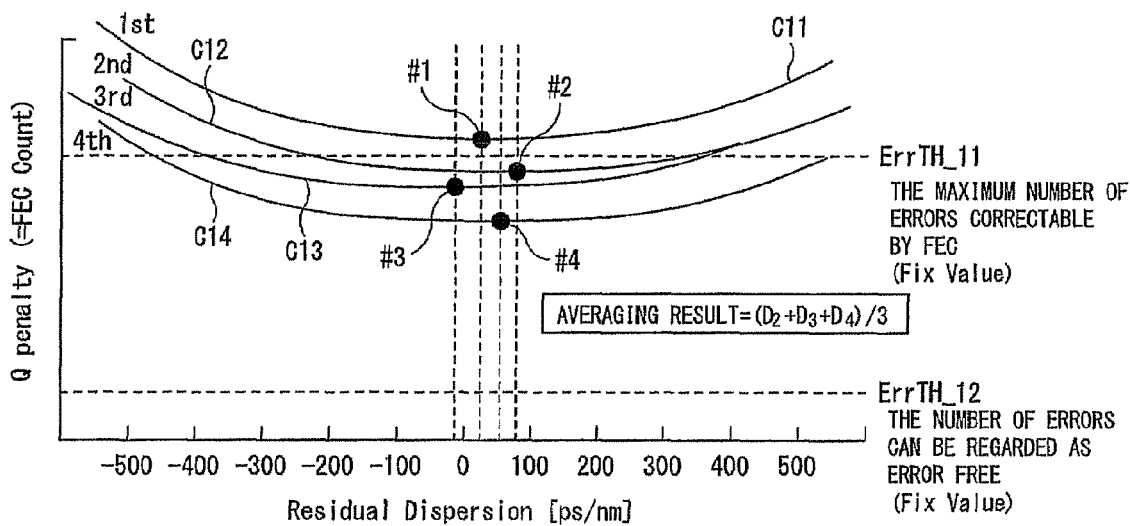
FIG. 5 A diagram showing an operation performed in the first embodiment.

For example, as a result of the searching of the first through the fourth cycles as illustrated in FIG. 5, amounts D2-D4 of dispersion control of the second to the fourth cycles from which the amount D(1) of dispersion control of the first cycle exceeding the re-searching threshold Th2 is excluded are averaged, and the result (D2+D3+D4)/3 of the averaging can be output to represent the result of search. Even if the dispersion characteristics of optical transmission path 2 caused from PMD appear on a number of amounts of dispersion control detected by detecting section 16 as illustrated by tolerance curves C11-C14 at different cycles as illustrated in FIG. 5, averaging these amounts of dispersion control can rough the affect caused by PMD.

Figure 13:
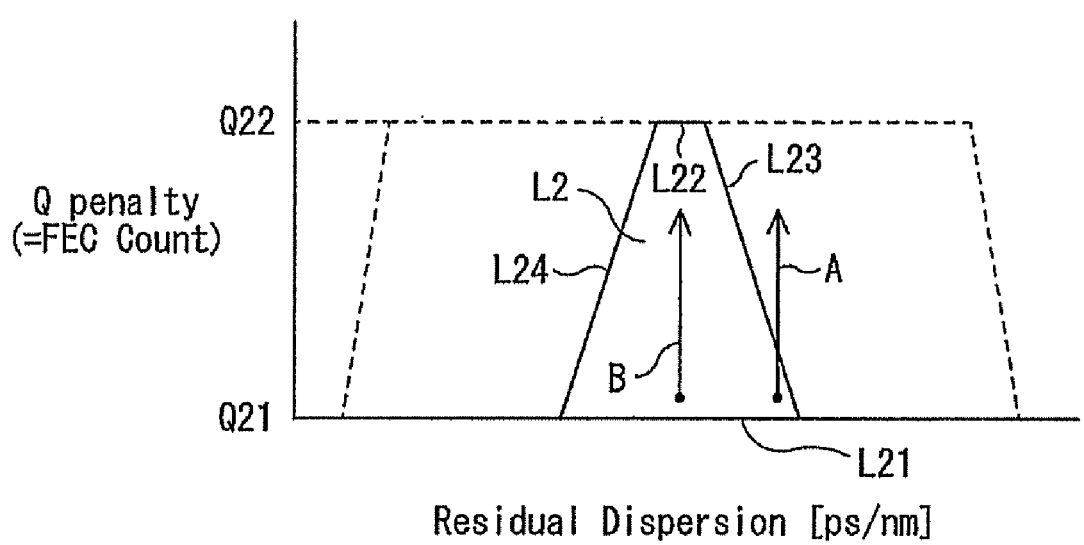
FIG. 13 A diagram showing a relationship between a dispersion tolerance width and a Q penalty value of an optical signal having a transmission speed of 40 Gbit/s.

In other words, even in requiring strict dispersion characteristics for optical transmission of 40 Gbit/s as illustrated in FIG. 13, it is possible to more rapidly search a region in a trapezoidal shape for a point on the dispersion-Q penalty coordinate that is able to establish connection in synchronization of the searching process performed in sweep searching unit 20 than a conventional technique.

Splitting-half-searching result outputting section 18 may regard a single amount of dispersion control detected by detecting section 16 as the amount of dispersion control obtained as a result of the roughly searching.

Further, completion of roughly searching by splitting-half searching unit 10 is followed by an fine adjustment to be made on the result of the roughly search in sweep searching unit 20 as illustrated in FIG. 3. In the searching by sweeping (dithering) performed as illustrated in flowchart FIG. 3 a single cycle of searching sweeps the limited region in a direction of increasing and decreasing in amount of dispersion control starting from the amount of dispersion control output from splitting-half-searching result outputting section 18. Control amount sweeping section 21 of sweep searching unit 20 introduces a variable B representing the number of times of setting an amount of dispersion control into VDC 3 into the searching.

Representing the step width at which the dithering is carried out by Dstep, in the maximum movement width resulted from the maximum n steps of dithering in a single direction (increasing or decreasing the dispersion value) is represented by n×Dstep. In this embodiment, n steps of dithering are performed in the decreasing direction (when variable B varies from 2 to n+1). In other words, setting of an amount of control into VDC 3 and capturing of the number of corrected errors are carried out n times in the direction decreasing a dispersion value. Subsequently, another n steps of dithering is performed in the increasing direction (when variable B varies from n+2 to 2n+1).

First, at the start of searching in sweep searching unit 20, variable B at the initial setting value "0" (step B1) is increased by "1" (step B2) and control amount sweeping section 21 determines that amount DS(1) of dispersion control is the value should be set into VDC 3 (step B3) which amount represents the result of the rough adjustment output from splitting-half-searching result outputting section 18 of splitting-half searching unit 10. Prior to setting of the determined amount DS(1) into VDC 3, control amount sweeping section 21 judges whether or not the determined amount DS(1) is within the range of an amount of dispersion control settable into VDC 3 (step B4).

Namely, if DS(1) is within the range of an amount of dispersion control settable into VDC 3, the amount DS(1) is set into VDC 3 ("True" route from step B4 to step B5). Conversely, if DS(1) is beyond the settable range, sweeping in the decreasing direction is stopped to shift to sweeping in the increasing direction ("False" route in step B4, "True" route in step B11, "B=n+1" in step B12, and "False" route from step B9 to "B=n+2" in step B2).

Next, if the amount DS(1) of dispersion control is set into 3 and dithering is carried out in the decreasing direction, sweeping data obtaining section 22 captures FEC Count(1) representing the number of corrected errors serving as the signal quality index associated with the set amount of dispersion control from receipt data processor 4 (step B6). The value DS(y) represents an amount of dispersion control for the y-th time and FEC Count (y) represents the number of corrected error associated with the y-th amount of dispersion control (y=B).

Quality index judging section 24 judges whether or not FEC Count (1) representing the number of corrected errors captured in sweeping data obtaining section 22 is in excess of the upper threshold (the sweeping termination standard, see Errth_21 in FIG. 6) of one example of a range that secures establishment of the communication ("True" route from step B7 to step B8).

On the basis of the result of the judgment in quality index judging section 24, if FEC Count(1) is not in excess of the upper threshold (the sweeping termination standard) securing establishment of the communication, sweep controller 25 further continue the sweeping ("True" route in step B8) On the other hand, if FEC Count(1) is in excess of the upper threshold, sweep controller 25 stops the dithering in the decreasing direction and shifts to the sweeping in the dithering in the increasing direction (B8 の "False" from step B8 to "True" route in step B11, step B12, "False" route in step B9 to step B2).

If FEC Count(1) representing the number of corrected errors is not in excess of the above upper threshold to continue the sweeping, control amount sweeping section 21 increases variable B by one (i.e., B=2, "False" route from step B9 to step B2), determines an amount of dispersion control to be DS(2)=DS(1)−DSstep×(2−1)=DS(1)−Dsstep that is in the decreasing direction (step B3) and sets the amount DS(2) of dispersion control into VDC 3 ("True" route from step B4 to step B5). Next, sweeping data obtaining section 22 captures from receipt data processor 4 FEC Count(2) representing the number of corrected error and serving as a signal quality index after setting amount DS(2) of dispersion control into VDC 3 x (step B6).

Subsequently, control amount sweeping section 21 determines amounts of dispersion control in the decreasing direction (i.e., DS(B)=DS(1)−DSstep×(B−1)) similarly to the case of B=2 until variable B becomes B=n+1, and the determined amounts of dispersion control are sequentially set into VDC 3 (step B2 to step B6).

Also in this case, control amount sweeping section 21 judges whether or not each of the above determined amounts DS(B) of dispersion control is within the predetermined range between the lower and the upper limits, that is, the settable range into VDC 3, prior to setting of each determined amount of dispersion control into VDC 3. If an amount DS(B) is within the settable range into VDC 3, the amount DS(B) of dispersion control is set into VDC 3 ("True" route from step B4 to step B5). On the other hand, if the amount DS(B) is outside the settable range, the procedure shifts to calculation of amounts of dispersion control used for dithering in the increasing direction ("False" route in step B4, "True" route in step B11, B=n+1 in step B12, and "false" route from step B9 to B=n+2 in step B2).

While each amount DS(B) of dispersion control swept in the decreasing direction (where B is 2 to n+1) is set into VDC 3 and FEC Count(B) associated with the amount DS(B) is captured, quality index judging section 24 judges whether or not the number of corrected errors captured in sweeping data obtaining section 22 exceeds the predetermined preferable quality standard ("False" route in step B7 following step B6 to step B10).

Specifically, if the captured number of corrected errors is judged to be below the lower threshold, which represents signal quality good enough to require no further search any longer, sweep controller 25 terminates the searching procedure irrespective of the direction of the current search. Thereby sweeping result outputting section 23 can detect an amount of dispersion control associated with the smallest number of corrected errors among all the amounts of dispersion control hitherto captured and output the detected amount of dispersion control ("False route of step B10 to step B14).

If an amount of dispersion control that results in signal quality good enough to require no further search even the above limited range due to the excellent property of optical transmission path 2 is found, the searching procedure can be terminated at that time point. That makes it possible to further improve the speed of the searching process performed in sweep searching unit 20. The lower limit serving as the standard for the excellence judgment can be, for example, the error-free value Errth_22 illustrated in FIG. 6.

After determining that the number of corrected errors captured by sweeping data obtaining section 22 is not in excess of the predetermined preferable quality standard, quality index judging section 24 further judges whether or not the number (FEC Count (B)) of corrected errors is in excess of the upper limit (the sweeping termination standard) which can secure the establishment of communication ("True" route of step B10 to step B8).

If the number (FEC Count (B)) of corrected errors is not in excess of the upper limit (the sweeping termination standard) which can secure the establishment of communication, the dithering in the decreasing direction continues ("True" route of step B8). However, if the number (FEC Count (B)) of corrected errors is in excess of the upper limit ("False" route of step B8), control amount sweeping section 21 terminates the dithering in the decreasing direction under control of sweep controller 25 and the procedure is to shift to dithering in the increasing direction ("True" route from step B11, B=n+1 in step B12, and "False" route of step B9 to B=n+2 of step B2).

If the sweeping reaches the limit D(n+1) in the decreasing direction without obtaining FEC Count (B) representing the number of corrected errors in excess of the upper threshold that can ensure the establishment of communication ("False" route of step B9), sweep controller 25 controls control amount sweeping section 21 such that dithering in the increasing direction subsequently starts from amount DS(1) of dispersion control obtained as the result of the rough adjustment output from splitting-half-searching result outputting section (step B2 and step B3). In this case, amounts of dispersion control are successively calculated in the increasing direction by DS(B)=DS(1)+DSstep×(B−1−n) and the obtained amounts of dispersion control are set into VDC 3 (step B2 to step B6).

In performing dithering also in the increasing direction, control amount sweeping section 21 judges whether or not each amount DS(B) of dispersion control calculated in the above manner is in the range between the predetermined upper and lower limits, that is, the settable range into VDC 3 prior to the setting of the amount of dispersion control into VDC 3. Specifically, if an amount DS(B) of dispersion control is within the settable range into VDC 3, the same amount of dispersion control is set into VDC 3 ("True" route in step B4 to step B5). Conversely, if the amount DS(B) of dispersion control is outside the settable range, the dithering being performed in the increasing direction halts. Since that means the termination of the dithering in the increasing and decreasing directions, sweeping result outputting section 23 extracts and detects the optimum amount of dispersion control ("False" route of step B4, "False" route of step B11, B=2n+1 of step B13, "True" route of step B9 to step B14).

Further, also in searching on the above condition B=n+2 to B=2n+1, quality index judging section 24 judges whether or not the number of corrected errors captured by sweeping data obtaining section 22 is beyond the preferable quality standard and the sweeping termination standard. Namely, if the captured number of corrected errors is judged to be beyond the predetermined preferable quality standard, more specifically judged to be below the lower threshold of a range representing excellent signal quality that requires no further search, sweep controller 25 terminates the searching procedure irrespective of the direction of the searching and sweeping result outputting section 23 subsequently detects the optimum amount of dispersion control ("False" route of step B10 to step B14).

If quality index judging section 24 determines that the number of corrected errors captured by sweeping data obtaining section 22 is not in excess of the predetermined preferable quality standard, quality index judging section 24 subsequently judges whether or not the number FEC Count (B) of corrected errors exceeds the upper threshold (the sweeping termination standard) which can ensure the communication establishment ("True" route from step B10 to "False" route of step B8).

If the number FEC Count(B) of corrected errors in not in excess of the upper threshold (the sweeping termination standard) which can ensure the communication establishment, sweep controller 25 continues the dithering in the increasing direction ("True" route of step B8). In contrast, if the number FEC Count(B) is in excess of the upper threshold, sweep controller 25 terminates the dithering procedure and shifts to detection of the optimum amount of dispersion control by sweeping result outputting section 23 ("False" route of step B8, "False" route of step B11, B=2n+1 of step B13, "True" route from step B9 to step B14).

Upon termination of the searching in the increasing direction, sweeping result outputting section 23 selects an amount of dispersion control associated with the least FEC Count representing the least corrected errors as the amount of dispersion control that makes the signal quality preferable among from the amounts DS(1) to DS(2n+1) of dispersion control, each of which is associated with the number of corrected errors captures during the sweeping, and outputs the selected amount of dispersion control to serve as the result of searching by sweep searching unit 20 (step B14).

Figure 6:
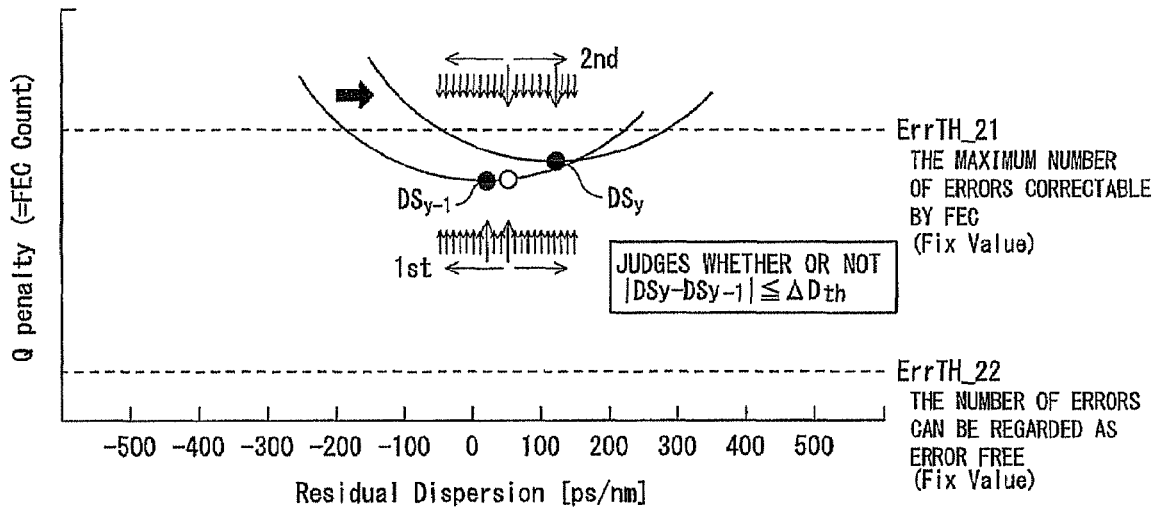
FIG. 6 A diagram showing an operation performed in the first embodiment.

Further, re-searching controller 26 controls sections 21-25 in such a manner that a single cycle consisting of the above steps B1 through B14 aiming at searching for an amount of dispersion control is carried out two continuous cycles and concurrently judges whether or not the difference of the amounts DSy and DSy−1 of dispersion control obtained as the result of detection during two searching cycles is in excess of the threshold ΔDth for re-searching to be carried out in sweep searching unit 20 (see FIG. 6).

If the difference of the amounts DSy and DSy−1 of dispersion control is not beyond the threshold ΔDth for re-searching, the latest amount Dsy of dispersion control is output to represent the result of the searching in sweep searching unit 20 and the series of the searching procedure is terminated ("True" route in step B15). On the other hand, if the difference is in excess of the threshold ΔDth, re-searching controller 26 controls sections 21-25 to re-search an amount of dispersion control ("False" route in step B15). Note that Dsy represents an amount of dispersion control detected in the y-th cycles by sweeping result outputting section 23.

The limited range of sweep searching unit 20 can be determined to distant as far as DSstep×n in the both increasing and decreasing directions from amount DS(1) of dispersion control representing the result of the roughly searching output from splitting-half-searching result outputting section 18. The width DSstep×2n of the limited range can be defined to be the value substantially including the dispersion fluctuation width assumed to be the fluctuation in the optimum amount of dispersion control caused by PMD.

Even if OSNR or PMD cause the dispersion characteristic of optical transmission path 2 to fluctuate during the searching in sweep searching unit 20, it is thereby possible to search an amount of dispersion control keeping up with the fluctuation. Consequently, as compared with a conventional technique in which an amount of dispersion control is re-searched by, for example, a threshold judgment after the fluctuation in dispersion characteristics, the present invention can improve the compatibility of the searching with fluctuation due to OSNR and PMD.

Such a fluctuation width can be set within a range satisfactory narrower (e.g., approximately one third or less, for example) than the settable range into VDC 3, so that the sweeping range can be narrower than that of a conventional technique to enhance the speed of searching.

As described above, the present invention roughly searches in the splitting half method the settable range in VDC 3 for an amount of dispersion control which cause receipt data processor 4 to generate a preferable quality index in splitting-half searching unit 10, and further searches the limited range based on the amount of dispersion control searched by splitting-half searching unit 10 for an amount of dispersion control that causes receipt data processor 4 to generate the optimum amount of dispersion control by sweeping in sweep searching unit 20. Thereby, the present invention has an advantage that an amount of dispersion control can be searched for faster than a conventional technique.

Even if a receiving optical signal has not undergone a process to compensate for PMD, the present invention advantageously can set an amount of dispersion control that minimizes the affects due to variation in temperature of the optical fiber and due to PMD at a high speed.

(B) Others:

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A dispersion compensation controlling apparatus comprising:
   a dispersion controller compensating for a dispersion of an input signal with a variable amount of dispersion compensation control;
   a quality index generator generating a quality index representing a quality of an optical signal output from said dispersion controller; and
   a searching unit searching for an amount of dispersion control applying to said dispersion controller which amount optimizes the quality index generated by said quality index generator, wherein said searching unit comprises
      a splitting-half searching unit roughly searching, in a splitting half method, a range in which dispersion is controllable by said dispersion controller for an amount of dispersion control such that the quality index generated by said quality index generator becomes preferable, and
      a sweep searching unit thoroughly searching, by sweeping, a limited range based on the amount of dispersion searched by said splitting-half searching unit for an amount of dispersion control that optimizes the quality index generated by said quality index generator,
   wherein said splitting-half searching unit comprises:
      a setting instructing section issuing an instruction to said dispersion controller to set into said dispersion controller an amount of dispersion control used to capture the quality index, said setting instruction section including a default setting instructing section successively setting into said dispersion controller two predetermined default amounts of dispersion control and an amount of dispersion control representing a center value of the two predetermined default amounts and serving as a default center value;
      a splitting-half-searching data obtaining section obtaining, from said quality index generator, a quality index of an optical signal compensated at the amount of dispersion control set according to the instruction of said setting instructing section;
      a dispersion control amount determining section determining, on the basis of the result of the obtaining by said splitting-half-searching data obtaining section, an amount of dispersion control that is to be set by an instruction issued from setting instructing section and to be used for subsequently obtaining the quality index by splitting-half-searching data obtaining section, and including
         a first processor setting into said dispersion controller subsequently to the setting of the default center value an amount of dispersion control corresponding to a center value between the default center value and an amount of dispersion control associated with a smaller quality index among the quality indexes associated with two amounts of dispersion control set previously to the setting of the default center value into said dispersion controller, and obtaining from said quality index generator a quality index associated with the amount of dispersion control set subsequently to the default center value, and
         a second processor repeating, until the difference between the latest amount of dispersion control and an amount of dispersion control set immediate previously to the latest amount of dispersion control comes to be equal to or smaller than a predetermined difference threshold, or smaller than the predetermine difference threshold, a procedure including: setting into said dispersion controller an amount of dispersion control corresponding to a center value between a latest amount of dispersion control set the latest and an amount of dispersion control associated with a smaller quality index of the quality indexes associated with two amounts of dispersion control set previously to the setting of the latest amount of dispersion control into said dispersion controller; and obtaining from said quality index generator the quality index associated with the amount of dispersion control set subsequently to the latest amount of dispersion control;
      a detecting section detecting, when the difference between the latest amount of dispersion control and the amount of dispersion control set immediate previously to the latest amount of dispersion control comes to be equal to or smaller than the predetermined difference threshold, or smaller than the predetermine difference threshold, an amount of dispersion control associated with a most preferable quality index among all amounts of dispersion control, including the default amounts of dispersion control, ever set in said dispersion controller; and a splitting-half-searching result outputting section outputting the result of the roughly searching based on the amount of dispersion control detected by said detecting section.

2. The dispersion compensation controlling apparatus according to claim 1, further comprising a re-searching controller controlling, if said a quality index of an optical signal compensated at the amount of dispersion control detected by said splitting-half-searching result outputting section is larger than a predetermined re-searching threshold, said setting instructing section such that the searching in the splitting-half method is carried out by controlling said default setting instructing section to set an amount of dispersion control into said dispersion controller without outputting from said splitting-half-searching result outputting section the result of the roughly searching based on the amount of dispersion control detected by said detecting section.

3. The dispersion compensation controlling apparatus according to claim 1, wherein said splitting-half-searching result outputting section activates a searching procedure to be performed in said sweep searching unit by outputting the result of the searching based on the amount of dispersion control detected in said splitting-half searching unit to represent the result of the searching.

4. The dispersion compensation controlling apparatus according to claim 1, wherein:

said splitting-half-searching result outputting section controls said setting instructing section such that the searching in the splitting half method is performed until outputting a predetermined number of searching results; and said splitting-half-searching result outputting section averages said predetermined number of searching results output from said splitting-half-searching controller, and outputting the result of the averaging, as the result of the searching, to said dispersion controller in order to activate the searching procedure performed in said sweep searching unit.

5. The dispersion compensation controlling apparatus according to claim 1, wherein the limited range for the searching by said sweep searching unit is set so as to actually include a dispersion width assumed to be fluctuation in optimum amount of dispersion control, said fluctuation being caused from polarization mode dispersion.

6. The dispersion compensation controlling apparatus according to claim 1, wherein said sweep searching unit comprises:

a control amount sweeping section sweeping the limited region for an amount of dispersion control at predetermined steps in a direction, one from an increasing direction and a decreasing direction, the amount of dispersion control;

a sweeping data obtaining section obtaining from said quality index generator a quality index associated with the amount of dispersion control swept by control amount sweeping section;

a sweeping result outputting section detecting an amount of dispersion control which is in a range in which said control amount sweeping section sweeps for the amount of dispersion control and which is associated with the most preferable quality index obtained by sweeping data obtaining section, and outputting the detected amount of dispersion control to be the result of searching;

a quality index judging section judging whether or not the quality index obtained by sweeping data obtaining section reaches a predetermined preferable standard and further judging whether or not the quality index exceeds a predetermined sweeping termination standard beyond which continuation of the sweeping in the direction is not required any longer; and a sweep controller stopping, if said quality index judging section judges the quality index obtained exceeds the predetermined sweeping termination standard, the sweeping in the direction by said control amount sweeping section and stopping, if said quality index judging section judges the quality index obtained reaches the predetermined standard or if said control amount sweeping section completes or terminates the sweeping in the increasing and the decreasing direction, the sweeping at the amount of dispersion control even when the sweeping over the limited range has not been completed, if the sweeping by said control amount sweeping section is terminated by said sweep controller, said sweeping result outputting section detecting an amount of dispersion control associated with the most preferable quality index in the range in which the amount of dispersion control has been swept and outputting the detected amount of dispersion control to be the result of the searching.

7. A method for searching for an amount of dispersion control performed by a searching unit included in a dispersion compensation controlling apparatus comprising a dispersion controller compensating for a dispersion of an input signal with a variable amount of dispersion control, a quality index generator generating a quality index representing a quality of an optical signal output from the dispersion controller; and a searching unit searching for an amount of dispersion control applying to the dispersion controller which amount optimizes the quality index generated by said quality value generator, said method comprising:

in an initial setting, roughly searching in a splitting half method a range in which dispersion is controllable by the dispersion controller for an amount of dispersion control that optimizes a quality index generated by the quality index generator; and thoroughly searching, by sweeping, a limited range based on the amount of dispersion searched for as the result of said roughly searching for an amount of dispersion control that optimizes a quality index generated by the quality index generator, said searching in the splitting half method comprising:

obtaining, from the quality index generator, quality indexes associated one to each of two default amounts of dispersion control and a default center value representing an amount of dispersion control at a center value of the two default amounts of dispersion control by successively setting into the dispersion controller the two default amounts of dispersion control and the default center value;

a first procedure including setting, into the dispersion controller subsequently to the setting of the default center value, an amount of dispersion control corresponding to a center value between the default center value and an amount of dispersion control associated with a smaller quality index among the quality indexes associated with two amounts of dispersion control set previously to the setting of the default center value into said dispersion controller, and obtaining from the quality index generator a quality index associated with the amount of dispersion control set subsequently to the default center value;

a second procedure repeating, until a difference between the latest amount of dispersion control and an amount of dispersion control set immediate previously to the latest amount of dispersion control comes to be equal to or smaller than a predetermined difference threshold, or smaller than the predetermine difference threshold, a procedure including: setting into said dispersion controller an amount of dispersion control corresponding to a center value between a latest amount of dispersion control set the latest and an amount of dispersion control associated with a smaller quality index of the quality indexes associated with two amounts of dispersion control set previously to the setting of the latest amount of dispersion control into said dispersion controller; and obtaining from the quality index generator the quality index associated with the amount of dispersion control set subsequently to the latest amount of dispersion control;

a third procedure detecting, when the difference between the latest amount of dispersion control and the amount of dispersion control set immediate previously to the latest amount of dispersion control comes to be equal to or smaller than the predetermined difference threshold, or smaller than the predetermine difference threshold, an amount of dispersion control associated with a most preferable quality index among all amounts of dispersion control, including the default amounts of dispersion control, ever set in said dispersion controller; and a fourth procedure outputting section outputting the result of said roughly searching based on the detected amount of dispersion control.

8. The method for searching for an amount of dispersion control according to claim 7, wherein said fourth procedure regards the amount of dispersion control detected in said third procedure as the result of said roughly searching on which said searching by sweeping is based.

9. The method for searching for an amount of dispersion control according to claim 7, said fourth procedure averaging a number of amounts of dispersion control obtained by repeating said first to said third procedures a number of times and regarding a value obtained by said averaging as the amount of dispersion control serving as the result of said roughly searching.

10. The method for searching for an amount of dispersion control according to claim 7, wherein:

if the amount of dispersion control detected in said third procedure is larger than a predetermined re-searching threshold, another amount of dispersion control is searched for in the splitting half method.

11. The method for searching for an amount of dispersion control according to claim 7, wherein the limited range in which said searching by said sweeping is set so as to actually include a dispersion width assumed to be fluctuation in optimum amount of dispersion control, the fluctuation being caused from polarization mode dispersion.

12. The method for searching for an amount of dispersion control according to claim 7, said searching by said sweeping comprising:

sweeping the limited region for an amount of dispersion control at predetermined steps in a direction, one from an increasing direction and a decreasing direction;

successively obtaining from the quality index generator a quality index associated with the amount of dispersion control searched by said sweeping;

detecting an amount of dispersion control which is in a range in which a plurality of the amounts of dispersion control have been swept for and which is associated with the most preferable quality index, and outputting the detected amount of dispersion control to represent the result of said searching;

judging whether or not the quality index obtained reaches a predetermined preferable standard and further judging whether or not the quality index exceeds a predetermined sweeping termination standard beyond which continuation of the sweeping in the direction is not required any longer;

stopping, if the quality index obtained is judged to exceed the predetermined sweeping termination standard, the sweeping in the direction by said control amount sweeping section and stopping, if the quality index obtained is judged to reach the predetermined standard or if the sweeping in the increasing and the decreasing direction has been completed or terminated, the sweeping for the amount of dispersion control even when the sweeping over the limited range has not been completed, detecting an amount of dispersion control associated with the most preferable quality index in the range in which the amounts of dispersion control have been swept and outputting the detected amount of dispersion control to be the result of the searching.

13. A dispersion compensation controlling apparatus comprising:

a dispersion controller compensating for a dispersion of an input signal with a variable amount of dispersion compensation control;

a quality index generator generating a quality index representing a quality of an optical signal output from said dispersion controller; and a searching unit searching for an amount of dispersion control applying to said dispersion controller which amount optimizes the quality index generated by said quality index generator, wherein said searching unit comprises a splitting-half searching unit roughly searching, in a splitting half method, a range in which dispersion is controllable by said dispersion controller for an amount of dispersion control such that the quality index generated by said quality index generator becomes preferable, and a sweep searching unit thoroughly searching, by sweeping, a limited range based on the amount of dispersion searched by said splitting-half searching unit for an amount of dispersion control that optimizes the quality index generated by said quality index generator, wherein said sweep searching unit comprises:

a control amount sweeping section sweeping the limited region for an amount of dispersion control at predetermined steps in a direction, one from an increasing direction and a decreasing direction;

a sweeping data obtaining section obtaining from said quality index generator a quality index associated with the amount of dispersion control swept by control amount sweeping section;

a sweeping result outputting section detecting an amount of dispersion control which is in a range in which said control amount sweeping section sweeps for the amount of dispersion control and which is associated with the most preferable quality index obtained by sweeping data obtaining section, and outputting the detected amount of dispersion control to be the result of searching;

a quality index judging section judging whether or not the quality index obtained by sweeping data obtaining section reaches a predetermined preferable standard and further judging whether or not the quality index exceeds a predetermined sweeping termination standard beyond which continuation of the sweeping in the direction is not required any longer; and a sweep controller stopping, if said quality index judging section judges the quality index obtained exceeds the predetermined sweeping termination standard, the sweeping in the direction by said control amount sweeping section and stopping, if said quality index judging section judges the quality index obtained reaches the predetermined standard or if said control amount sweeping section completes or terminates the sweeping in the increasing and the decreasing direction, the sweeping at the amount of dispersion control even when the sweeping over the limited range has not been completed, if the sweeping by said control amount sweeping section is terminated by said sweep controller, said sweeping result outputting section detecting an amount of dispersion control associated with the most preferable quality index in the range in which the amount of dispersion control has been swept and outputting the detected amount of dispersion control to be the result of the searching.

14. The dispersion compensation controlling apparatus according to claim 13, wherein the limited range for the searching by said sweep searching unit is set so as to actually include a dispersion width assumed to be fluctuation in optimum amount of dispersion control, said fluctuation being caused from polarization mode dispersion.

* * * * *